US011361242B2

(12) United States Patent
Green

(10) Patent No.: US 11,361,242 B2
(45) Date of Patent: Jun. 14, 2022

(54) GENERATING RECOMMENDATIONS USING A DEEP-LEARNING MODEL

(71) Applicant: META PLATFORMS, INC., Menlo Park, CA (US)

(72) Inventor: Bradley Ray Green, Snohomish, WA (US)

(73) Assignee: Meta Platforms, Inc., Menlo Park, CA (US)

(*) Notice: Subject to any disclaimer, the term of this patent is extended or adjusted under 35 U.S.C. 154(b) by 1414 days.

(21) Appl. No.: 15/337,978

(22) Filed: Oct. 28, 2016

(65) Prior Publication Data

US 2018/0121827 A1 May 3, 2018

(51) Int. Cl.
*G06N 20/00* (2019.01)
*G06Q 50/00* (2012.01)
*G06N 3/08* (2006.01)
*G06N 20/10* (2019.01)

(52) U.S. Cl.
CPC .............. *G06N 20/00* (2019.01); *G06N 3/08* (2013.01); *G06N 20/10* (2019.01); *G06Q 50/01* (2013.01)

(58) Field of Classification Search
CPC .......... G06N 20/00; G06N 20/10; G06N 3/08; G06Q 50/01
See application file for complete search history.

(56) References Cited

U.S. PATENT DOCUMENTS 9,037,464 B1 * 5/2015 Mikolov ............. G06F 17/2785
704/255
9,129,227 B1 9/2015 Yee et al.
9,147,154 B2 * 9/2015 Wang ..................... G06N 3/02
2005/0257099 A1 11/2005 Bounkong
2011/0191374 A1 8/2011 Bengio
(Continued)

FOREIGN PATENT DOCUMENTS

JP 2013-519138 A 5/2013
WO 2014/160282 10/2014

OTHER PUBLICATIONS

T. Mikolov, et al., "Distributed Representations of Words and Phrases and their Compositionality," Oct. 16, 2013, arXiv:1310.4546, pp. 1-9 (Year: 2013).*

(Continued)

*Primary Examiner* — Miranda M Huang
*Assistant Examiner* — Catherine F Lee
(74) *Attorney, Agent, or Firm* — Baker Botts L.L.P.

(57) ABSTRACT

In one embodiment, an embedding is determined for each entity in a set of entities that is selected from a plurality of entities. Each embedding corresponds to a point in an embedding space, which includes points corresponding to embeddings of entities. The embeddings of the entities are determined using a deep-learning model. Embeddings are determined for each entity attribute in a set of entity attributes. Each of the entity attributes in the set is of an entity-attribute type and is associated with at least one entity. The entity-attribute embeddings are refined using the deep-learning model. The embeddings of the entities in the set of entities are modified based on the entity-attribute embeddings that are associated with the respective entity to obtain updated embeddings for each entity in the set. The updated embeddings include information regarding the entity attributes that are associated with the respective entities.

22 Claims, 7 Drawing Sheets

(56) References Cited

U.S. PATENT DOCUMENTS

2013/0097140 A1* 4/2013 Scheel ............... G06F 16/9535
707/706
2013/0290222 A1 10/2013 Gordo
2015/0293976 A1* 10/2015 Guo ..................... G06F 16/248
707/706

OTHER PUBLICATIONS

T. Mikolov, et al., "Distributed Representations of Words and Phrases and their Compositionality," Oct. 16, 2013, arXiv: 1310.4546 [cs.CL], pp. 1-9 (Year: 2013).*
Faruqui, et al., "Retrofitting Word Vectors to Semantic Lexicons," Proceedings of the 2015 Conference of the North American Chapter of the Association for Computational Linguistics: Human Language Technologies, pp. 1606-1615, 2015.
Chang, et al., "Heterogeneous Network Embedding via Deep Architectures," Knowledge Discovery and Data Mining, ACM, pp. 119-128, Aug. 10, 2015.
Zhang, et al., "Collaborative Knowledge Base Embedding for Recommender System," Proceedings of the $22^{nd}$ ACM Sigkdd International Conference on Knowledge Discovery and Data Mining, pp. 353-362, Aug. 13, 2016.
Xu, et al., "RC-Net," Conference on Information and Knowledge Management, ACM, pp. 1219-1228, Nov. 3, 2014.
European Search Report received from the European Patent Office, for European Patent Application No. 17163758.0-1879, dated Oct. 17, 2017.
JP Decision to Grant received for Patent Application No. JP2019-522918. (With English Abstract).

* cited by examiner

600

- 610 — determine an embedding for each entity in a first set of entities, where the first set of entities is selected from a plurality of entities, each embedding corresponds to a point in an embedding space, the embedding space comprises a plurality of points corresponding to embeddings of a plurality of entities, and the embeddings of the entities are determined using a deep-learning model

- 620 — determine embeddings for each entity attribute in a first set of entity attributes, where each of the entity attributes in the first set of entity attributes is of an entity-attribute type, each entity attribute of the first set of entity attributes is associated with at least one entity of the plurality of entities, and the embeddings of the entity attributes are refined using the deep-learning model

- 630 — modify the embeddings of the entities in the first set of entities based on the embeddings of the entity attributes that are associated with the respective entity to obtain updated embeddings for each entity in the first set of entities, wherein the updated embeddings comprise information regarding the entity attributes that are associated with the respective entities.

*FIG. 6*

GENERATING RECOMMENDATIONS USING A DEEP-LEARNING MODEL

TECHNICAL FIELD

This disclosure generally relates to training deep-learning models.

BACKGROUND

Deep-learning is a type of machine learning that may involve training a model in a supervised or unsupervised setting. Deep-learning models may be trained to learn representations of data. As an example and not by way of limitation, a deep-learning model may represent data as vectors of intensity values. The vectors of intensity values may correspond to points in an embedding space. Deep-learning models may be used to generate embeddings that compress heterogeneous data in a meaningful way in an embedding space.

SUMMARY OF PARTICULAR EMBODIMENTS

In particular embodiments, a system may use a deep-learning model to identify one or more content items that are similar to an inputted content item. The deep-learning model may be trained to map entities to embeddings in a multi-dimensional embedding space. Each embedding may correspond to coordinates of a point in the embedding space. The deep-learning model may be trained to generate embeddings of entities that incorporate attributes of the entities. Thus, differing variables (i.e., entity attributes of different types) may be represented in the same embedding space via the embeddings of entities.

Embeddings of entities that incorporate entity attributes may be used to accomplish any number of suitable tasks. The embedded entities may include entities of attributes that are meaningfully compressed such that vector arithmetic (i.e., vector addition and subtraction) may be performed on the corresponding vector representations of the entities. A system may employ a search algorithm to identify one or more embeddings of entities as proximate to a point in the embedding space, where the point is determined using vector algebra. As an example and not by way of limitation, the system may identify embeddings of entities in response to a received search query that is inputted by a user at a client system. The user may input a question, and the system may translate the question to vector arithmetic. The vector arithmetic may be applied to the embedding space, and one or more entities may be identified in response to the question. The identified entities may be displayed to the user as suggestions on an interface of an application running on the client system (e.g., a messaging platform, an application associated with a social-networking system, or any other suitable application). As another example and not by way of limitation, a system may identify embeddings of entities that are complements to particular entities in the embedding space using vector arithmetic. As another example and not by way of limitation, the entities may be pages of a social-networking system, and a system may generate contextual page recommendations for a user by employing vector arithmetic based on a context change of the user (e.g., a context change in the user's profile on the social-networking system).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates an example method for generating embeddings of entities that include information regarding associated entity attributes.

DESCRIPTION OF EXAMPLE EMBODIMENTS

System Overview

Figure 1:
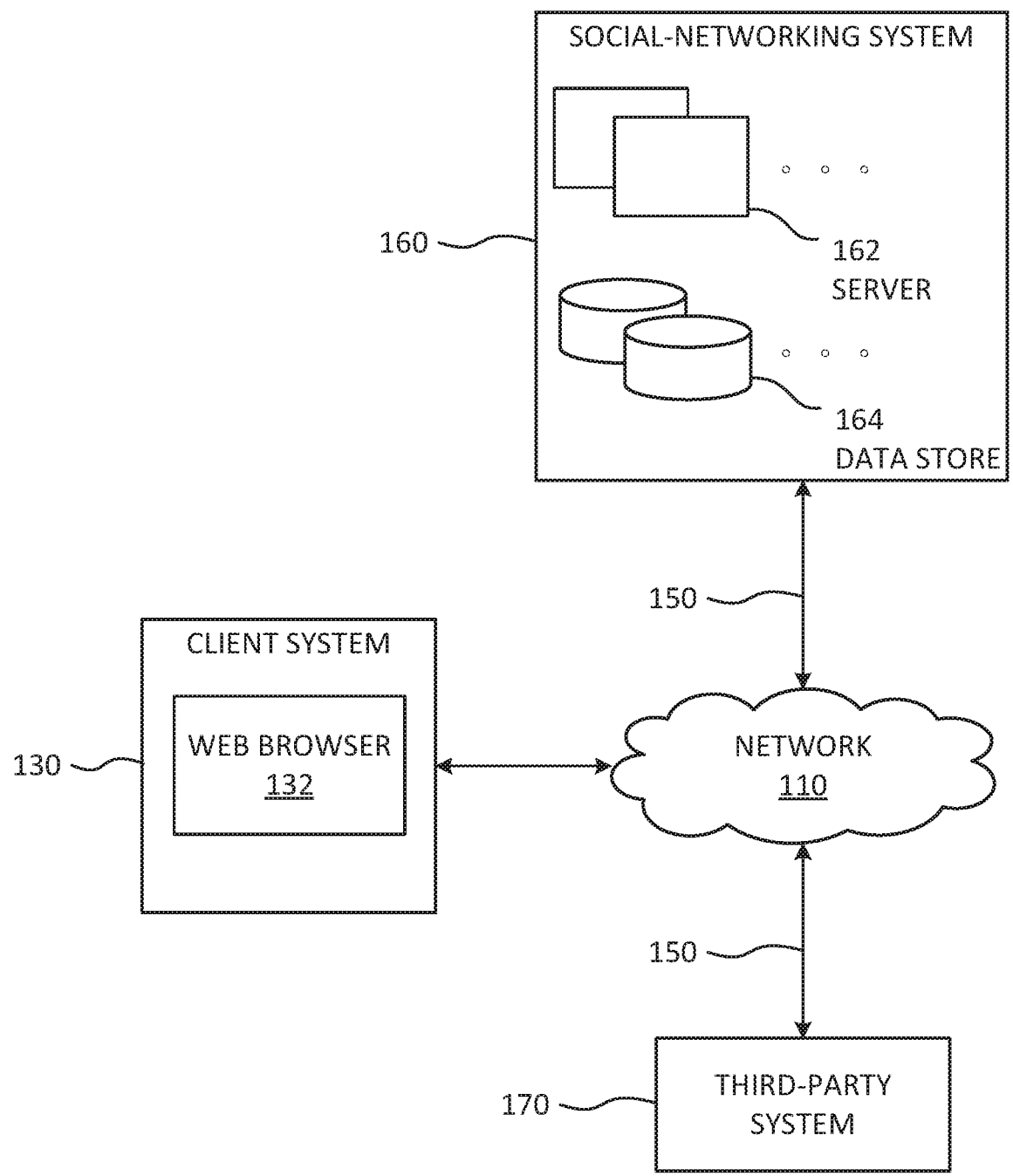
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
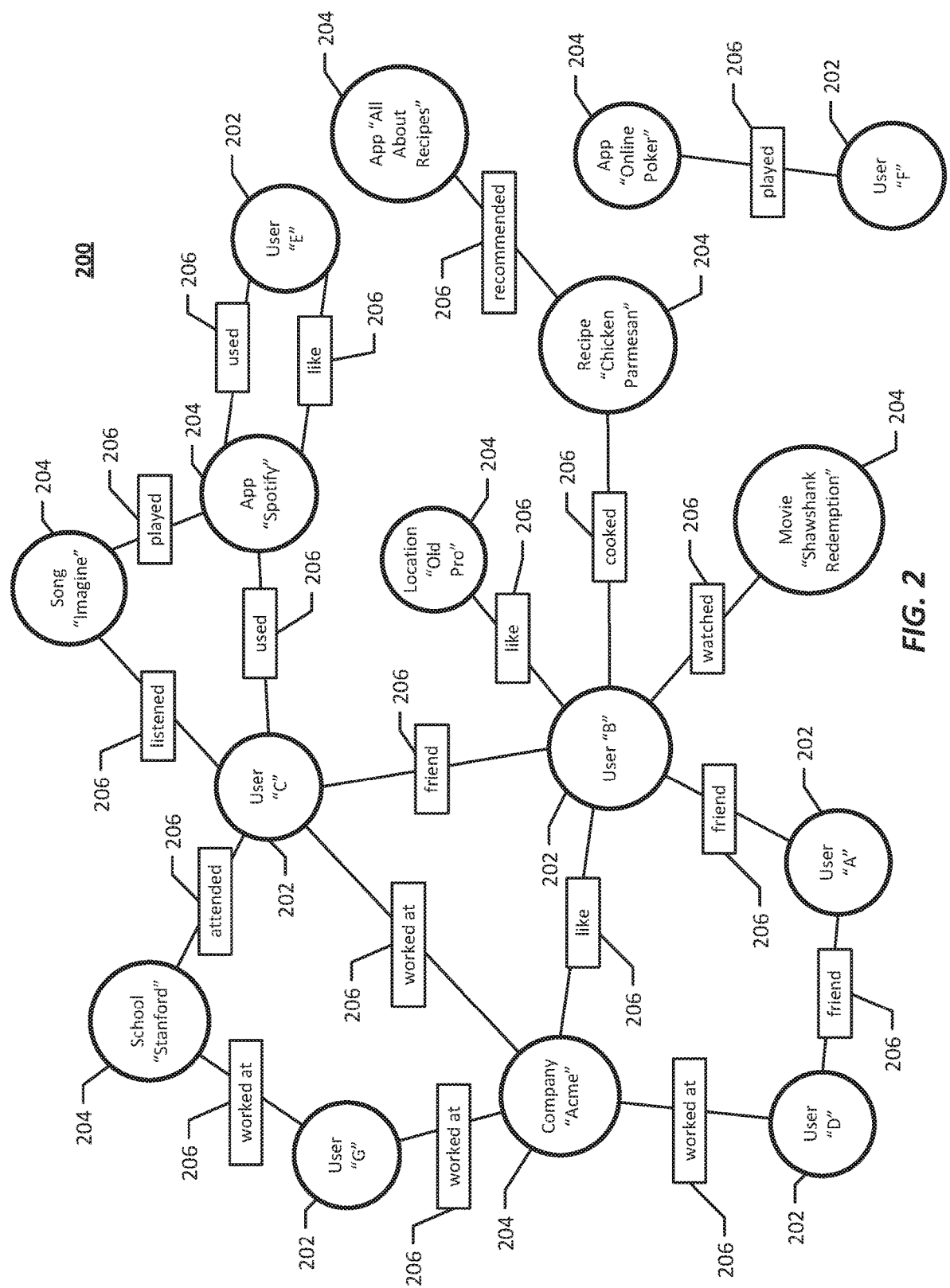
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Training a Deep-Learning Model

Particular embodiments identify one or more entities as a substitute for or complement to a given entity using one or more deep-learning models. A deep-learning model may be used to generate embeddings of entities in an embedding space that each incorporate heterogeneous data associated with the entities. As an example and not by way of limitation, an embedding of an entity may include information regarding any suitable number of entity attributes that are associated with the respective embedding. Entities may include, as an example and not by way of limitation, pages associated with social-graph entities (e.g., pages associated with users or concepts of social-networking system 160), webpages, any other suitable entities, or any combination thereof. As used herein, entity attributes may include, as an example and not by way of limitation, users (e.g., users who have interacted with an entity), topics (e.g., topics associated with posts made by or on an entity), categories (e.g., categorical profile data from an entity), location data (e.g., a location associated with an entity), entity size (e.g., a number of users who have "fanned" or "liked" or otherwise interacted positively with an entity), any other suitable properties of an entity, or any combination thereof.

Figure 3:
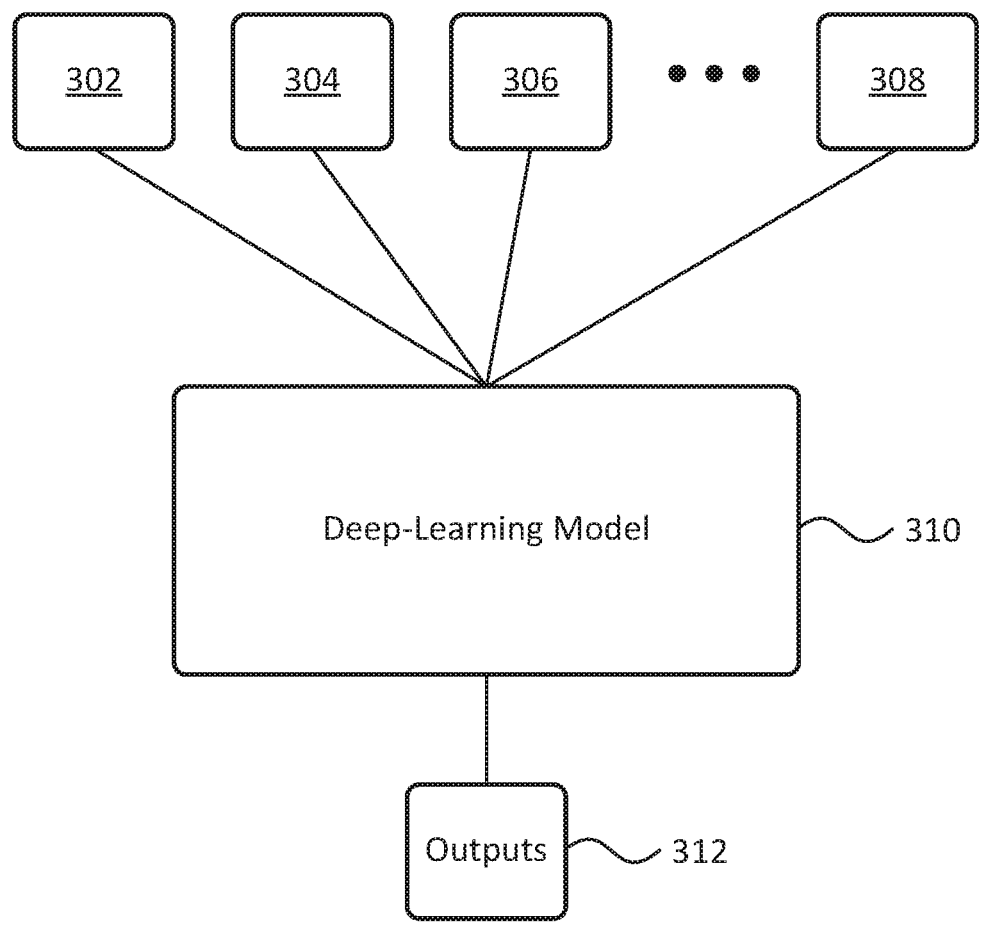
FIG. 3 illustrates an example deep-learning model.

FIG. 3 illustrates an example deep-learning model 310. Deep-learning model 310 may be a machine-learning model, a neural network, a latent neural network, any other suitable deep-learning model, or any combination thereof. In particular embodiments, deep-learning model 310 may have a plurality of layers of abstraction. Inputs 302, 304, 306, and 308 may be any suitable number of entities. In particular embodiments outputs 312 may be one or more embeddings of entities in an embedding space. In particular embodiments, outputs 312 may be embeddings of entity attributes in an embedding space. The embedding space may be a multi-dimensional space (e.g., d-dimensional, where d is a hyper-parameter that controls capacity) and may include a plurality of points corresponding to embeddings of content items. As used herein, an embedding of an entity refers to a representation of an entity in the embedding space. Although a particular number of input entities 302, 304, 306, and 308 are illustrated in FIG. 3, deep-learning model 310 may generate embeddings of entities for any suitable number of input entities 302, 304, 306, and 308.

In particular embodiments, deep-learning model 310 (e.g., a neural network) may include one or more indices that map entities to vectors in $\mathbb{R}^d$, where $\mathbb{R}$ denotes the set of real numbers, and d is a hyper-parameter that controls capacity. The vectors may be d-dimensional intensity vectors. As used herein, intensity values may be any suitable values in the range of −1 to 1. Each of the vector representations of entities may provide coordinates for respective points in the embedding space. Although a particular number of input entities 302, 304, 306, and 308 are illustrated in FIG. 3, deep-learning model 310 may provide mappings between any suitable number of entities 302, 304, 306, and 308 and vector representations.

Deep-learning model 310 may be trained to generate optimal embeddings of entities. In particular embodiments, deep-learning model 310 may comprise one or more deep-learning models. Deep-learning model 310 may include one or more indices, which may be dynamically updated as the deep-learning model 310 is trained. The one or more indices may be generated during a training phase of deep-learning model 310. Deep-learning model 310 may be, as an example and not by way of limitation, a neural network, latent neural network, or any other suitable deep-learning model. Deep-learning model 310 may be initialized using a random distribution. That is, deep-learning model 310 may initially have randomly-assigned mappings (i.e., between entities 302, 304, 306, and 308 and vector representations, based on which embeddings of entities 302, 304, 306, and 308 may be generated). As an example and not by way of limitation, the random distribution may be a Gaussian distribution. The training may result in the one or more indices of deep-learning model 310 generating more optimal mappings than the initial mappings.

Although this disclosure describes and illustrates particular embodiments of FIG. 3 as being implemented by social-networking system 160, this disclosure contemplates any suitable embodiments of FIG. 3 as being implemented by any suitable platform or system. As an example, and not by way of limitation, particular embodiments of FIG. 3 may be implemented by client system 130, third-party system 170, or any other suitable system. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, one or more deep-learning models 310 may operate on different types of entity attributes to generate an embedding of an entity that compresses all the entity and associated entity-attribute data in a meaningful way (i.e., that supports vector addition and subtraction). The system may generate embeddings of pages that take into account the attributes of the pages (e.g., heterogeneous data associated with the page). Thus, pages may, effectively, be embedded in the same embedding space as entity attributes of the pages, including, as an example and not by way of limitation, users, categories, locations, and sizes. As an example and not by way of limitation, for the page for Homewood Mountain Resort, user data associated with the Homewood page may include people who "follow" or are "fans" of the Homewood page. Topics data associated with the Homewood page may include posts by the Homewood page about specific topics (e.g., Homewood page posts about weather conditions) and topics specified by the page in ad targeting (e.g., skiing, snowboarding, Tahoe, snow). Categories data associated with the Homewood page may include labeled categories specified by page administrator (e.g., Lake Tahoe, ski resort); categories suggested by users; and categories determined by a machine-learning system. Location data associated with the Homewood page may include specific addresses/locations specified by the page administrator (e.g., address of Homewood Mountain Resort), locations of people who have interacted with the page (e.g., check-ins at address), and locations that the page has targeted advertising towards (e.g., California-side of Lake Tahoe).

Iteratively Embedding Heterogeneous Data

Figure 4:
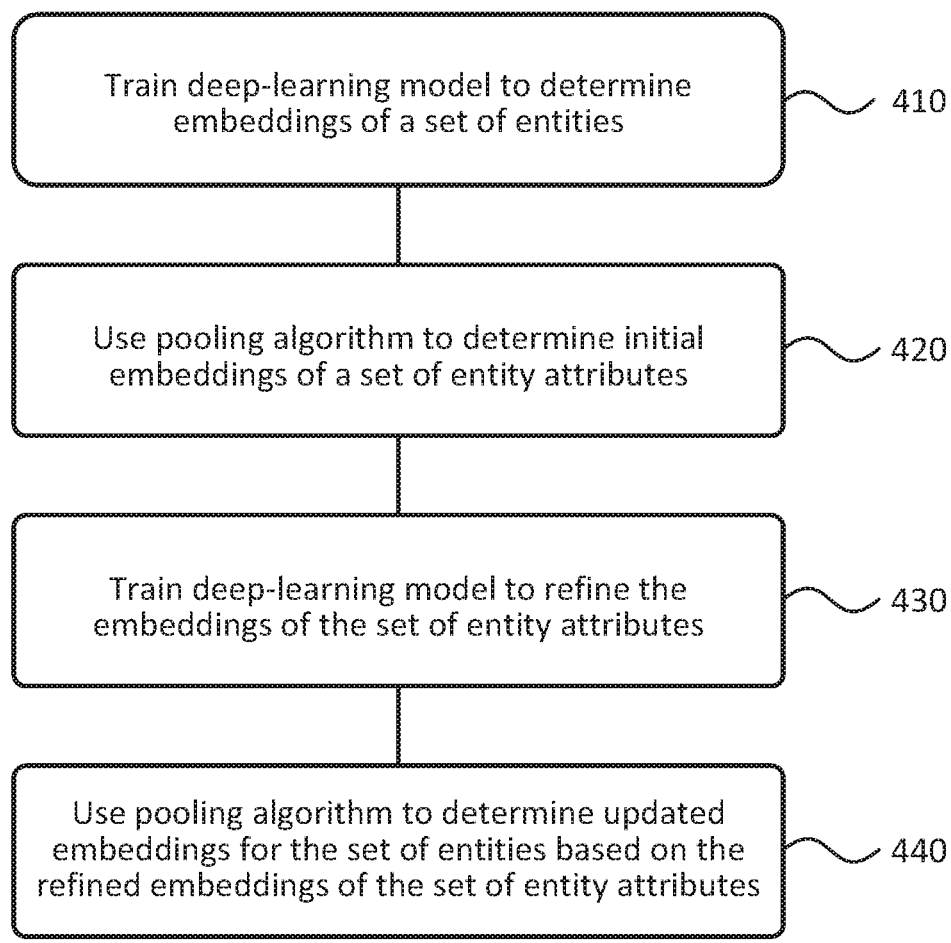
FIG. 4 illustrates an example method for embedding entities and associated entity attributes in an embedding space.

FIG. 4 illustrates an example method 400 for embedding entities and associated entity attributes in an embedding space. At step 410, a system may train a deep-learning model 310 to determine embeddings in an embedding space of a set of entities. As an example and not by way of limitation, entities may be pages of social-networking system 160. The system may train deep-learning model 310 using training data that includes an ordered sequence of data associated with each page. As an example and not by way of limitation, the system may train deep-learning model 310 using training data that includes, for each page, a sequence of other pages that a user has expressed affinity for when they have also expressed affinity for the respective page; a sequence of topics extracted from the posts of the page; a sequence of topics used in advertising of the page; a sequence of ad keywords used in an advertising campaign associated with the page; a sequence of labeled categories associated with the page by the page administrator; a sequence of locations associated with the page (e.g., neighborhood, city, state, country, continent); and a sequence of size information corresponding to numbers of users who have "fanned" or "liked" the page; or any other suitable sequence of training data. As an example and not by way of limitation, the page for which an embedding is being generated may be a page for the movie IRON MAN, and the training data may include a sequence of pages that a user has expressed affinity for when he has also expressed affinity for the IRON MAN page: THE AVENGERS, CAPTAIN AMERICA, MINNESOTA VIKINGS, and MINNESOTA TWINS. As another example and not by way of limitation, the training data for the page for IRON MAN may include a sequence of topics extracted from the posts of the IRON MAN page: ANT MAN, movie, premiere, trailer, and Robert Downey Jr. As another example and not by way of limitation, the training data for the page for IRON MAN may include a sequence of ad keywords from an advertising campaign associated with the IRON MAN page: ANT MAN, movie, theater, MARVEL, and action movie. As another example and not by way of limitation, training data for a page for Coach Sushi may include a sequence of labeled categories associated with the page by the page administrator: sushi, restaurant, Japanese, sake, sashimi, and tempura. As another example and not by way of limitation, training data for the page for Coach Sushi may include a sequence of locations associated with the page or with users that interact with the page: Adam's Point, Lake Merritt, Oakland, Calif., United States of America, North America.

The system may train deep-learning model using training data that is actually associated with the respective page (i.e., positive samples only). The system may train deep-learning model 310 using, as an example and not by way of limitation, Skip-Gram Negative Down-Sampling, or any other suitable training algorithm. Particular embodiments use a training algorithm that employs a sliding window of a particular length that includes an entity and a context. The context may include any suitable number of training data items (e.g., five training data items) based on the length of the sliding window. The deep-learning model may be trained to maximize the conditional probability that the entity appears when a particular training data item in the context appears. The training algorithm used to train deep-learning model 310 may generate embeddings whose corresponding vector representations support vector algebra (i.e., vector addition and subtraction).

The set of entities for which embeddings are being determined at step 410 may include any suitable number of entities. In particular embodiments, the entities in the set of entities may be randomly sampled from a corpus of entities. As example and not by way of limitation, the set of entities may include 25% of all the entities for which embeddings are to be generated. As example and not by way of limitation, the set of entities may be selected as a batch of an arbitrary, fixed size. As example and not by way of limitation, the size of the set of entities (i.e., the number of entities in the set of entities) may be a parameter that is fixed in advance of training of deep-learning model 310.

At step 420, the system may use a pooling algorithm to determine initial embeddings of a set of entity attributes. An entity may be a page, and entity attributes may be associated with pages. Entity attributes may be of a particular entity-attribute type. Entity-attribute types may include, as an example and not by way of limitation, users (e.g., users who have interacted with a page, or any other suitable user), topics (e.g., topics associated with posts made by or on a page, advertising topics specified by the page, or any other suitable topic), categories (e.g., categorical profile data from a page, labeled categories associated with the page by the administrator, categories associated with a page that are suggested by users, categories associated with a page that are determined by a machine-learning process of social-networking system 160, or any other suitable categories), location data (e.g., a location associated with a page, a location associated with a user who has interacted with the page, a location to which the page is advertised, or any other suitable location), entity size (e.g., a number of users who have "fanned" or "liked" or otherwise interacted positively with a page), any other suitable properties of a page, or any combination thereof. The set of entity attributes may include entity attributes of one type (e.g., homogeneous data). As an example and not by way of limitation, the entity attributes may of the entity-attribute type topics and may include topics associated with posts made by or posted on a page. Topics may be any suitable subjects or labels associated with text. As used herein, labels may be hashtags, emoji, stickers, ideograms, any other suitable text annotations, any other suitable characters, symbols, or images, which each may represent an idea or thing with or without using letters or words, or any combination thereof.

In particular embodiments, the embeddings of the set of entities (e.g., pages) determined at step 410 may be used to construct the initial embeddings of a set of entity attributes (e.g., topics). In particular embodiments, the pooling algorithm used to generate the embeddings of the set of entities may be a sum pooling algorithm. As an example and not by way of limitation, the system may determine the initial embedding for each entity attribute in the set of entity attributes by taking an average of the sum of the embeddings of pages that are associated with the respective topic (e.g., pages that are associated with the particular topic entity attribute). As an example and not by way of limitation, the vector representation and the corresponding embedding of the topic "movie" may be determined by taking an average of the sum of the vector representations of pages associated with the topic "movie" (i.e., "movie" is a topic associated with a post of or on the page). In particular embodiments, the pooling algorithm to determine an embedding of a topic, denoted by $\gamma(\text{topic})$, may be given by:

$$\Gamma(\text{pages}) = \{\text{page:page associated with topic}\} \quad (1)$$

$$\gamma(\text{topic}) = \frac{1}{|\Gamma(\text{pages})|} \sum_{page \in \Gamma(pages)} \gamma(\text{page}) \quad (2)$$

As used herein, $|\Gamma(\text{pages})|$ denotes the size of the set of embeddings of pages that are associated with the topic, and $\gamma(\text{page})$ denotes the embedding of a page associated with the topic.

At step 430, the system may train the deep-learning model 310 to refine the embeddings of the set of entity attributes. In particular embodiments the deep-learning model used to generate the embeddings of entities at step 410 and the deep-learning model used to refine the embeddings of entity attributes at step 430 may be the same deep-learning model 310. Deep-learning model 310 may be trained using any of the techniques described in connection with step 410. As an example and not by way of limitation, the system may train deep-learning model 310 using Skip-Gram Negative Down-Sampling, or any other suitable training algorithm. In particular embodiments, deep-learning model 310 may be retrained using topic-training data. This topic-training data may be input into the deep-learning model 310, and initial embeddings of the topics may be constructed using a pooling algorithm, as described above. The topic-training data may include, as an example and not by way of limitation, sequences of topics used in ad targeting or sequences of topics appearing on a page, or sequences of topics associated with users, or any other suitable topic-training data. Deep-learning model 310 may then generate refined embeddings of the set of entity attributes.

At step 440, the system uses a pooling algorithm to determine updated embeddings for the set of entities from step 410 based on the refined embeddings of the set of entity attributes determined at step 430. The system may modify the embeddings of the set of entities determined at step 410 based on the embeddings of the set of entity attributes determined at step 430. In particular embodiments, the pooling algorithm used to generate the embeddings of the first set of entities may be a sum pooling algorithm. As an example and not by way of limitation, the updated vector representation and the corresponding embedding of the page for IRON MAN may be determined by adding to the old vector representation of the page IRON MAN (i.e., determined at step 410) a sum of the refined vector representations of topics (determined at step 430) that are mentioned in posts on or by the page for IRON MAN. In particular embodiments, the pooling algorithm to determine an updated embedding of a page, denoted by $\gamma_2(\text{page})$, may be given by:

$$\Gamma(\text{topics}) = \{\text{topic:topic associated with page}\} \quad (3)$$

$$\gamma_2(\text{page}) = \gamma_1(\text{page}) + \frac{1}{|\Gamma(\text{topics})|} \sum_{topics \in \Gamma} \gamma(\text{topic}) + \alpha^j \quad (4)$$

As used herein, |Γ(topics)| denotes the size of the set of embeddings of topics that are associated with the page, $\gamma_1$(page) denotes the embedding of a page (e.g., as determined at step 410), γ(topic) denotes the refined embedding of a topic associated with the page (e.g., as determined at step 430), and $\alpha^i$ is a coefficient, where α∈(1,0) and i is an integer. The $\alpha^i$ term may decrease perturbation and learning during the update step (e.g., step 440 of FIG. 4). The system may then store the updated embeddings of the entities in the set of entities as the new embeddings for the entities (i.e., replacing the embeddings determined in step 410). Because the updated embeddings of the entities determined in step 440 were determined based on embeddings of entity attributes (e.g., topics), the updated embeddings include information regarding the entity attributes.

In particular embodiments, steps 410-440 of FIG. 4 may be iteratively repeated until the system has generated embeddings for all of the entities that take into account all of the entity attributes of a particular type (e.g., topics). As an example and not by way of limitation, the system may randomly sample 25% of a corpus of entities to form a first set of entities and 25% of a corpus of entity attributes of a particular type to form a first set of entity attributes. The system may use these first sets of entities and entity attributes in performing steps 410-440 of FIG. 4. The system may then randomly sample another 25% of the remaining corpus of entities to form a second set of entities and 25% of the remaining corpus of entity attributes of the particular type to form a second set of entity attributes. The system may use these second sets of entities and entity attributes in performing steps 410-440 of FIG. 4. The system may then randomly sample another 25% of the remaining corpus of entities to form a third set of entities and 25% of the remaining corpus of entity attributes of the particular type to form a third set of entity attributes. The system may use these third sets of entities and entity attributes in performing steps 410-440 of FIG. 4. Finally, the system may take the remaining 25% of the corpus of entities to form a fourth set of entities and the remaining 25% of the corpus of entity attributes of the particular type to form a fourth set of entity attributes. The system may use these fourth sets of entities and entity attributes in performing steps 410-440 of FIG. 4. In particular embodiments, the system may randomly interleave the updated embeddings of entities in between iterations of steps 410-440. In particular embodiments, steps 410-440 of FIG. 4 may be repeated iteratively until deep-learning model 310 converges. In particular embodiments, when the embeddings of entities are updated in step 440 of FIG. 4, all of the embeddings of entities may be updated, not just the embeddings in the particular set associated with that iteration (i.e., the first, second, third, and fourth sets of entity embeddings may be updated, not just the fourth set of entity embeddings). As an example and not by way of limitation, each time the system performs step 440 of FIG. 4, the system modifies the embeddings of each entity based on the embeddings of the entity attributes that are associated with the respective entity (i.e., using a pooling algorithm) to obtain an updated embedding for the respective entity.

In particular embodiments, the system may determine embeddings of entities that take into account (e.g., are based on) entity attributes of more than one type. As an example and not by way of limitation, the entities may be pages of social-networking system 160, and the entity attributes of a first type may be topics. In the same example, the system may repeat steps 410-440 of FIG. 4 (e.g., until deep-learning model 310 converges) to iteratively determine updated embeddings for each of these pages. The system may store the updated embeddings of pages in place of the initially determined embeddings of the pages. The system may then perform the same process to iteratively determine newly-updated embeddings of the pages that take into account entity attributes of a second type (e.g., locations). At step 420, the system may determine the initial embedding for each entity attribute in the second set of entity attributes by taking an average of the sum of the embeddings of pages that are associated with the respective topic (e.g., pages that are associated with the particular location entity attribute). At step 430, the system may train the deep-learning model using a training set of location data in order to refine these embeddings. At step 430, the system may use a pooling algorithm to determine updated embeddings for a randomly-sampled batch of the embeddings of pages (i.e., the embeddings of pages that are based on the embeddings of topics). The system may iteratively repeat the steps of FIG. 4 using sets of location entity attributes until updated embeddings of pages are determined that take into account information regarding topics and locations that are associated with the respective pages. In particular embodiments, the system may iteratively repeat this process (i.e., steps 410-440 of FIG. 4) until the embeddings of entities include information regarding any suitable number of entity attributes of different types.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Although this disclosure describes and illustrates particular embodiments of FIG. 4 as being implemented in a particular way, this disclosure contemplates any suitable embodiments of FIG. 4 occurring on any suitable interface and as being implemented by any suitable platform or system. As an example, and not by way of limitation, particular embodiments of FIG. 4 may be implemented by client system 130, social-networking system 160, third-party system 170, or any other suitable system. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Once the deep-learning model has been trained to generate embeddings of entities in an embedding space that incorporate information regarding the entity attributes associated with the entities, the embedding space may be used to accomplish a variety of tasks. As an example and not by way of limitation, the system may make page recommendations (i.e., entity recommendations) that take into account attributes of the pages, because the pages and the attributes of the pages are compressed into embeddings in the same embedding space.

Using an Embedding Space to Identify Entity Recommendations

Figure 5:
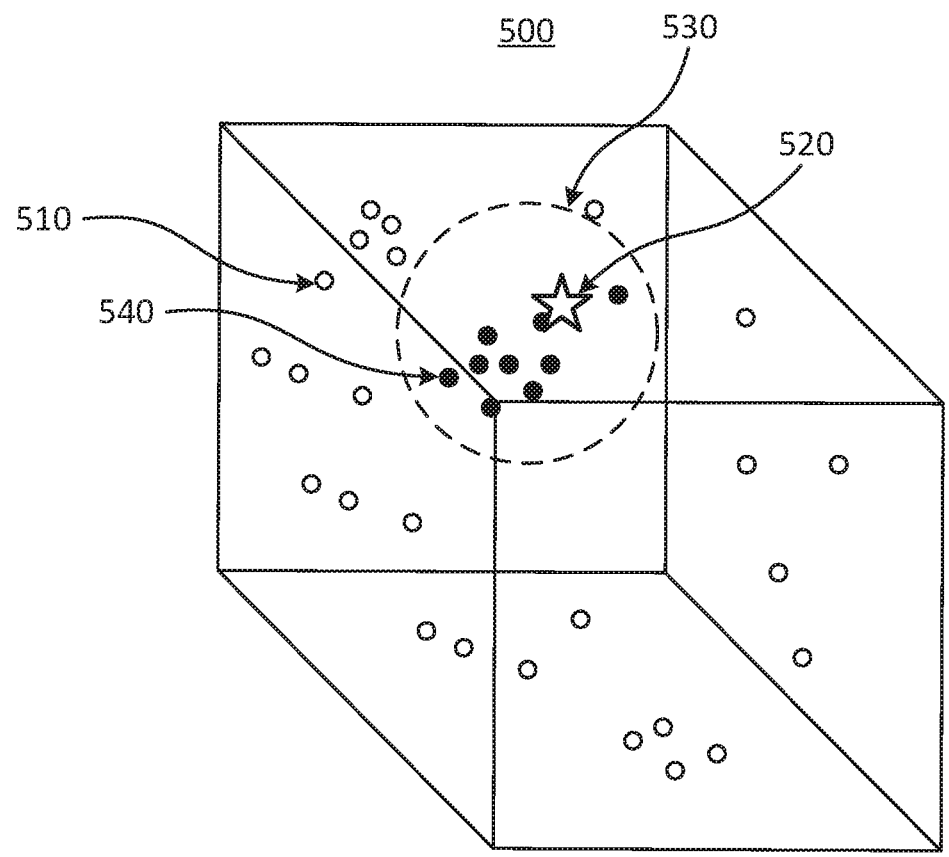
FIG. 5 illustrates an example view of an embedding space generated using a deep-learning model.

FIG. 5 illustrates an example view 500 of an embedding space. Embedding space 500 may include a point corresponding to an embedding of a target point 520 and a plurality of points corresponding to a plurality of embeddings of entities 510. A plurality of embeddings of entities may be determined based on the vector representations of entities determined using one or more deep-learning models 310 (e.g., as described in connection with FIG. 4), and the embeddings of entities may be represented in embedding space 500 as points 510. Points 510 may correspond to a plurality of embeddings of entities 510 that each take into account one or more entity attributes associated with the respective entity, as described above in connection with FIG. 4. The embedding space may be generated using deep-learning model 310. It will be understood that although the embedding space in FIG. 5 is depicted as being 2-dimensional, the embedding space may be of any suitable dimensionality (e.g., multi-dimensional).

In particular embodiments, embedding space 500 may be used to generate page recommendations (i.e., entity recommendations) for users of social-networking system 160. It will be understood that although entities may be described as being pages, this is merely illustrative and not by way of limitation. Entities may be any suitable entities, including, as an example and not by way of limitation, webpages. As described above in connection with FIG. 4, the method of meaningfully compressing the heterogeneous types of entity attributes (i.e., page attributes) into the embeddings of pages is suitable for vector arithmetic (e.g., addition and subtraction). Vector addition, vector subtraction, or both may be used with the vector representations of pages to provide contextual page recommendations. In particular embodiments, substitute page recommendations may be generated in response to the system detecting a change in a user profile or other data associated with the user of social-networking system 160. Substitute pages may be determined for any context change that has a determinable substitute. As an example and not by way of limitation, context changes for which substitutes may be determined may include location, relationship status, religious beliefs, alumni settings, job settings, any other suitable context, or any combination thereof. As an example and not by way of limitation, the system may detect that a user has changed a profile setting from a first context to a second context. In response to this detection, the system may generate an equation using vector arithmetic based on pages associated with the first and second contexts and a page that the user has liked or for which the user has otherwise expressed affinity. The result of the vector arithmetic is a target vector representation, which may be represented in embedding space 500 as target point 520. The system may determine the target point in response to detecting the change in the user's context or in response to an inputted user query. The system may identify one or more points corresponding to embeddings of entities 510 that are relevant to the target point 520 using a search algorithm. The search algorithm may be applied to embedding space 500 to identify points 540 corresponding to embeddings of entities that are within a threshold distance 530 of target point 520 corresponding to the embedding of the result of the vector arithmetic. As an example and not by way of limitation, the context changed may be current location, the first context may be the Philadelphia, the second context may be Oakland, and the system may use vector arithmetic to identify pages associated with Oakland that are substitutes for pages associated with Philadelphia. In the same example, the system may determine that the user has checked in to Del Frisco's Double Eagle Steakhouse in Philadelphia, so the system may then find a substitute for the Del Frisco's Double Eagle Steakhouse in Oakland. The vector arithmetic to determine one or more substitutes for the context change from Philadelphia to Oakland may be given by eq. (5):

$$|\text{argmin}{:}\gamma(\text{page})| = \gamma(\text{Del Frisco's}) - \gamma(\text{Philadelphia}) + \gamma(\text{Oakland}) \quad (5)$$

As used herein, $|\text{argmin}{:}\gamma(\text{page})|$ denotes the embedding of a page that is closest to (i.e., the minimum distance from) the target point 520 that is determined by evaluating the vector arithmetic on the right-hand side of eq. (5). $\gamma(\text{Del Frisco's})$ denotes the embedding of the page for Del Frisco's Double Eagle Steakhouse, $\gamma(\text{Philadelphia})$ denotes the embedding of the page for Philadelphia, and $\gamma(\text{Oakland})$ denotes the embedding of the page for Oakland. Eq. (5) may be evaluated because each of the embeddings has a corresponding vector representation. Once target point 520 is obtained via eq. (5), the system applies a search algorithm to find the points corresponding to embeddings of pages 540 that are closest to the target point 520 in embedding space 500. The identified points corresponding to embeddings of pages 540 may include, as an example and not by way of limitation, an embedding for the page for Michel Bistro, a restaurant in Oakland that may be a substitute for Del Frisco's Double Eagle Steakhouse in Philadelphia. In particular embodiments, social-networking system 160 may send the one or more pages identified as being substitutes based on the context change to a user's client system 130 for display to the user. In particular embodiments, the one or more identified pages may be displayed as part of a notification in a native application of social-networking system 160 running on the user's client system 130. In particular embodiments, the one or more identified pages may be displayed in a feed of a social-networking system 160. The one or more identified pages may be presented to the user at client system 130 in any suitable way.

In particular embodiments, embedding space 500 may be used to generate page recommendations that are complements to other pages for users of social-networking system 160. The system may utilize an ontology of topics and categories (e.g., category tree graphs) to determine complements and for particular pages. For example, the system may determine, based on an ontology of categories, that photographer is a complementary service to bakery, florist, and event planner services. If a user has "liked" or checked in to one or more of bakery, florist, and event planner services, the system may generate a vector expression to determine a photographer for recommendation to the user. As an example and not by way of limitation, the user may check in to Farmgirl Flowers, and the system may determine a florist that may be relevant to the user using eq. (6):

$$|\text{argmin}{:}\gamma(\text{page})| = \gamma(\text{Farmgirl Flowers}) - \gamma(\text{florist}) + \gamma(\text{photographer}) \quad (6)$$

As used herein, $|\text{argmin}{:}\gamma(\text{page})|$ denotes the embedding of a page that is closest to (i.e., the minimum distance from) the target point 520 that is determined by evaluating the vector arithmetic on the right-hand side of eq. (6). $\gamma(\text{Farmgirl Flowers})$ denotes the embedding of the page for Farmgirl Flowers, $\gamma(\text{florist})$ denotes the embedding of the page for florist, and $\gamma(\text{photographer})$ denotes the embedding of the page for photographer. Once target point 520 is obtained via eq. (6), the system applies a search algorithm to find the points corresponding to embeddings of pages 540 that are closest to the target point 520 in embedding space 500. The identified points corresponding to embeddings of pages 540 may include, as an example and not by way of limitation, an embedding for the Wyatt's Photography, a photography service that may be a complement to Farmgirl Flowers. In particular embodiments, social-networking system 160 may send the one or more pages identified as being complements to a user's client system 130 for display to the user. As described above, the one or more identified pages may be presented to the user at client system 130 in any suitable way.

As another example and not by way of limitation, the system may determine that baseball is a complement of football, and the system may know that the user "likes" the page for the Minnesota Vikings football team. In order to find a baseball-team complement for the Minnesota Vikings, the system may use eq. (7):

$$|argmin:\gamma(page)|=\gamma(Vikings)-\gamma(football)+\gamma(baseball) \quad (7)$$

As used herein, $|argmin:\gamma(page)|$ denotes the embedding of a page that is closest to (i.e., the minimum distance from) the target point 520 that is determined by evaluating the vector arithmetic on the right-hand side of eq. (7). $\gamma(Vikings)$ denotes the embedding of the page for the Minnesota Vikings, $\gamma(football)$ denotes the embedding of the page for football, and $\gamma(baseball)$ denotes the embedding of the page for baseball. Once target point 520 is obtained via eq. (7), the system applies a search algorithm to find the points corresponding to embeddings of pages 540 that are closest to the target point 520 in embedding space 500. The identified points corresponding to embeddings of pages 540 may include, as an example and not by way of limitation, an embedding for the Minnesota Twins, a baseball team that may be a complement to the Minnesota Vikings football team. In particular embodiments, social-networking system 160 may send the one or more pages identified as being complements to a user's client system 130 for display to the user. As described above, the one or more identified pages may be presented to the user at client system 130 in any suitable way.

In particular embodiments, embedding space 500 may be used to generate page recommendations in response to an inputted query by a user of social-networking system 160. In practice, a user may input a question, the beginning of an analogy (e.g., A is to B as C is to D), or any other suitable user input, and the system may access the embedding space 500 to find an answer (i.e., a page). As an example and not by way of limitation, the user may input: "What is the best sushi restaurant in San Francisco?" The system may determine that the user has "liked" a page for a particular sushi restaurant in Denver, so the system may then find a substitute for the Denver Sushi Restaurant in San Francisco using eq. (8):

$$|argmin:\gamma(page)|=\gamma(Denver\ Sushi)-\gamma(Denver)+\gamma(San\ Francisco) \quad (8)$$

As used herein, $|argmin:\gamma(page)|$ denotes the embedding of a page that is closest to (i.e., the minimum distance from) the target point 520 that is determined by evaluating the vector arithmetic on the right-hand side of eq. (8). $\gamma(Denver\ Sushi)$ denotes the embedding of the page for Denver Sushi, $\gamma(Denver)$ denotes the embedding of the page for Denver, and $\gamma(San\ Francisco)$ denotes the embedding of the page for San Francisco. Once target point 520 is obtained via eq. (8), the system applies a search algorithm to find the points corresponding to embeddings of pages 540 that are closest to the target point 520 in embedding space 500. The identified points corresponding to embeddings of pages 540 may include, as an example and not by way of limitation, an embedding for the page for SF Sushi, a restaurant in San Francisco that may be a substitute for Denver Sushi in Denver. In particular embodiments, social-networking system 160 may send the one or more pages identified as being complements to a user's client system 130 for display to the user. As described above, the one or more identified pages may be presented to the user at client system 130 in any suitable way.

Although this disclosure describes and illustrates particular embodiments of FIG. 5 as being implemented in a particular way, this disclosure contemplates any suitable embodiments of FIG. 5 occurring on any suitable interface and as being implemented by any suitable platform or system. As an example, and not by way of limitation, particular embodiments of FIG. 5 may be implemented by client system 130, social-networking system 160, third-party system 170, or any other suitable system. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example method 600 for generating embeddings of entities that include information regarding associated entity attributes. The method may begin at step 610, where an embedding for each entity in a first set of entities is determined. The first set of entities is selected from a plurality of entities. Each embedding corresponds to a point in an embedding space. The embedding space comprises a plurality of points corresponding to embeddings of a plurality of entities. The embeddings of the entities are determined using a deep-learning model. At step 620, embeddings are determined for each entity attribute in a first set of entity attributes. Each of the entity attributes in the first set of entity attributes is of an entity-attribute type. Each entity attribute of the first set of entity attributes is associated with at least one entity of the plurality of entities. The embeddings of the entity attributes are refined using the deep-learning model. At step 630, the embeddings of the entities in the first set of entities are modified based on the embeddings of the entity attributes that are associated with the respective entity to obtain updated embeddings for each entity in the first set of entities, wherein the updated embeddings comprise information regarding the entity attributes that are associated with the respective entities.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating embeddings of entities that include information regarding associated entity attributes including the particular steps of the method of FIG. 6, this disclosure contemplates any suitable method for generating embeddings of entities that include information regarding associated entity attributes including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
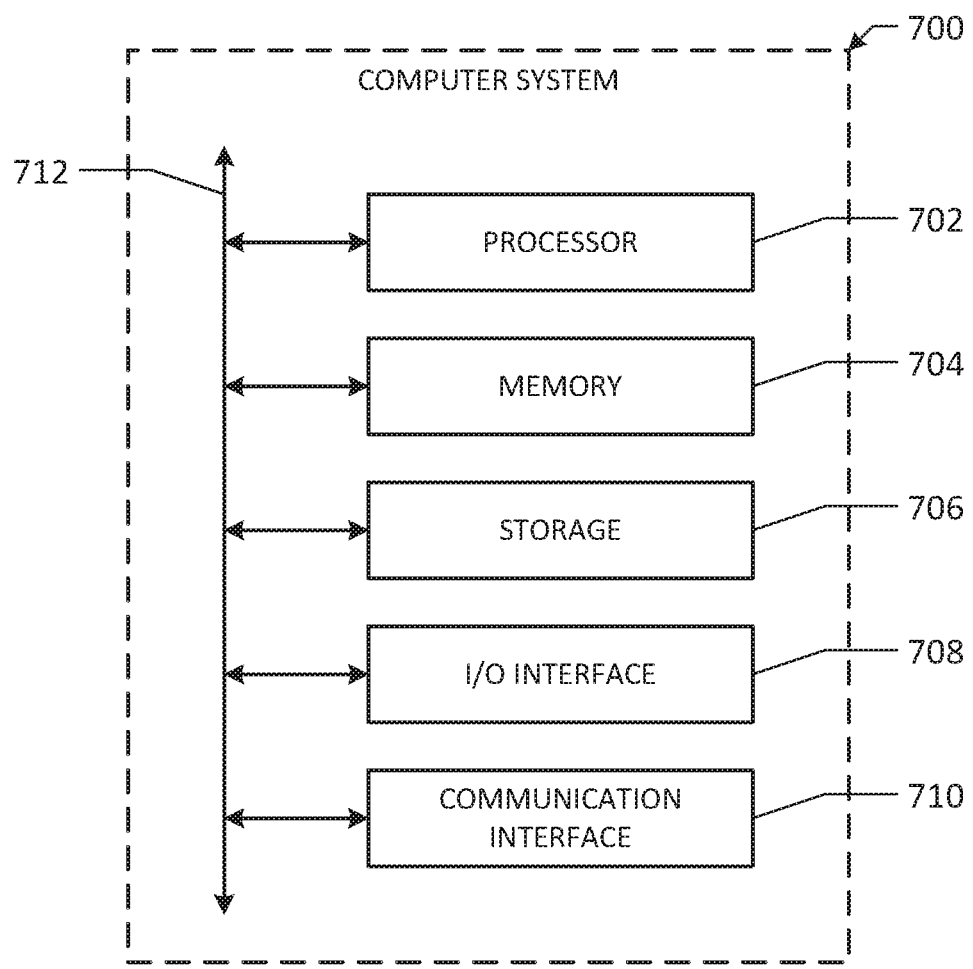
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
   determining, by one or more computing devices, an embedding for each entity in a first set of entities, wherein each entity in the first set of entities has a plurality of entity attributes, and wherein one or more of the plurality of entity attributes are entity attributes of a first set of entity attributes, and wherein:
   the first set of entities is selected from a plurality of entities,
   each embedding corresponds to a point in an embedding space, the embedding space comprises a plurality of points corresponding to embeddings of the plurality of entities, and the embeddings of the entities in the first set of entities are determined using a deep-learning model;

determining, by one or more of the computing devices, embeddings in the embedding space for each entity attribute in the first set of entity attributes, wherein:

each of the entity attributes in the first set of entity attributes is of an entity attribute-type, each of the entity attributes of the first set of entity attributes is associated with at least one entity of the first set of entities, and the embeddings of the entity attributes of the first set of entity attributes are refined using the deep-learning model; and modifying, by one or more of the computing devices, the embeddings in the embedding space for each entity in the first set of entities based on the embeddings of the entity attributes of the first set of entity attributes to obtain updated embeddings for each entity in the first set of entities, wherein the updated embeddings comprise information regarding the entity attributes of the first set of entity attributes.

2. The method of claim 1, further comprising:

determining embeddings for each entity in a second set of entities, the second set of entities being selected from the plurality of entities;

determining embeddings for each entity attribute in a second set of entity attributes, wherein each entity attribute in the second set of entity attributes is of the entity-attribute type; and modifying the embeddings of the entities in the first and second sets of entities based on the embeddings of the entity attributes that are associated with the entities in the first and second sets of entities to obtain new embeddings for each entity in the first and second sets of entities, wherein the new embeddings comprise information regarding the entity attributes that are associated with the entities of the first and second sets of entities.

3. The method of claim 1, wherein modifying the embedding of each entity comprises pooling the embedding of each entity in the first set of entities with the embeddings of the entity attributes that are associated with the respective entity.

4. The method of claim 1, wherein the plurality of entities comprise a plurality of pages in a social-networking system.

5. The method of claim 4, wherein the entity-attribute type is topics associated with the pages, categories associated with the pages, locations associated with the pages, or users associated with the pages.

6. The method of claim 1, wherein the deep-learning model is trained using Skip-Gram Negative Down-Sampling.

7. The method of claim 1, wherein each embedding in the embedding space corresponds to a respective vector representation.

8. The method of claim 1, further comprising:

detecting that a context item associated with a user of a social-networking system has been changed from a first context to a second context; and identifying one or more embeddings of the plurality of embeddings as being relevant to the second context by:

using vector arithmetic to determine a point in the embedding space associated with the second context, and applying a search algorithm to the embedding space, wherein points corresponding to one or more of the identified embeddings are within a threshold distance of the point corresponding to the determined point in the embedding space associated with the second context.

9. The method of claim 1, further comprising:

receiving a query, the query being inputted by a user;

translating the query to a vector expression;

evaluating the vector expression to identify a point in the embedding space associated with the query; and identifying one or more entities from among the plurality of entities as being relevant to the query by applying a search algorithm to the embedding space, wherein points corresponding to one or more embeddings of the identified entities are within a threshold distance of the point corresponding to the identified point in the embedding space associated with the query.

10. One or more computer-readable non-transitory storage media embodying software that is operable when executed to:

determine an embedding for each entity in a first set of entities, wherein each entity in the first set of entities has a plurality of entity attributes, and wherein one or more of the plurality of entity attributes are entity attributes of a first set of entity attributes, and wherein:

the first set of entities is selected from a plurality of entities, each embedding corresponds to a point in an embedding space, the embedding space comprises a plurality of points corresponding to embeddings of the plurality of entities, and the embeddings of the entities in the first set of entities are determined using a deep-learning model;

determine embeddings in the embedding space for each entity attribute in the first set of entity attributes, wherein:

each of the entity attributes in the first set of entity attributes is of an entity attribute type, each of the entity attributes of the first set of entity attributes is associated with at least one entity of the first set of entities, and the embeddings of the entity attributes of the first set of entity attributes are refined using the deep-learning model; and modify the embeddings in the embedding space for each entity in the first set of entities based on the embeddings of the entity attributes of the first set of entity attributes to obtain updated embeddings for each entity in the first set of entities, wherein the updated embeddings comprise information regarding the entity attributes of the first set of entity attributes.

11. The media of claim 10, further comprising:

determining embeddings for each entity in a second set of entities, the second set of entities being selected from the plurality of entities;

determining embeddings for each entity attribute in a second set of entity attributes, wherein each entity attribute in the second set of entity attributes is of the entity-attribute type; and modifying the embeddings of the entities in the first and second sets of entities based on the embeddings of the entity attributes that are associated with the entities in the first and second sets of entities to obtain new embeddings for each entity in the first and second sets of entities, wherein the new embeddings comprise information regarding the entity attributes that are associated with the entities of the first and second sets of entities.

12. The media of claim 10, wherein modifying the embedding of each entity comprises pooling the embedding of each entity in the first set of entities with the embeddings of the entity attributes that are associated with the respective entity.

13. The media of claim 10, wherein the plurality of entities comprise a plurality of pages in a social-networking system.

14. The media of claim 13, wherein the entity-attribute type is topics associated with the pages, categories associated with the pages, locations associated with the pages, or users associated with the pages.

15. A system comprising: one or more processors; and a memory coupled to the processors comprising instructions executable by the processors, the processors operable when executing the instructions to:
determine an embedding for each entity in a first set of entities, wherein each entity in the first set of entities has a plurality of entity attributes, and wherein one or more of the plurality of entity attributes are entity attributes of a first set of entity attributes, and wherein:
the first set of entities is selected from a plurality of entities,
each embedding corresponds to a point in an embedding space,
the embedding space comprises a plurality of points corresponding to embeddings of the plurality of entities, and
the embeddings of the entities in the first set of entities are determined using a deep-learning model;
determine embeddings in the embedding space for each entity attribute in the first set of entity attributes, wherein:
each of the entity attributes in the first set of entity attributes is of an entity-attribute type,
each of the entity attributes of the first set of entity attributes is associated with at least one entity of the first set of entities, and
the embeddings of the entity attributes of the first set of entity attributes are refined using the deep-learning model; and
modify the embeddings in the embedding space for each entity in the first set of entities based on the embeddings of the entity attributes of the first set of entity attributes to obtain updated embeddings for each entity in the first set of entities, wherein the updated embeddings comprise information regarding the entity attributes of the first set of entity attributes.

16. The system of claim 15, further comprising:
determining embeddings for each entity in a second set of entities, the second set of entities being selected from the plurality of entities;
determining embeddings for each entity attribute in a second set of entity attributes, wherein each entity attribute in the second set of entity attributes is of the entity-attribute type; and
modifying the embeddings of the entities in the first and second sets of entities based on the embeddings of the entity attributes that are associated with the entities in the first and second sets of entities to obtain new embeddings for each entity in the first and second sets of entities, wherein the new embeddings comprise information regarding the entity attributes that are associated with the entities of the first and second sets of entities.

17. The system of claim 15, wherein modifying the embedding of each entity comprises pooling the embedding of each entity in the first set of entities with the embeddings of the entity attributes that are associated with the respective entity.

18. The system of claim 15, wherein the plurality of entities comprise a plurality of pages in a social-networking system.

19. The system of claim 18, wherein the entity-attribute type is topics associated with the pages, categories associated with the pages, locations associated with the pages, or users associated with the pages.

20. The method of claim 1, wherein the embedding of an entity attribute is based on embeddings of one or more of the plurality of entities having the entity attribute.

21. The method of claim 20, wherein the deep-learning model refines the embedding of the entity attribute based on a creation of new embeddings of new entities having the entity attribute.

22. The method of claim 1, further comprising:
updating, by one or more of the computing devices, an embedding of a first entity attribute in the first set of entity attributes based on entities associated with the first entity attribute; and
modifying, by one or more of the computing devices, the embeddings of the entities of the first set of entities based on the updated embedding of the first entity attribute.

* * * * *